Dec. 1, 1931.  E. F. SUMMERS  1,834,037
FREE WHEELING COASTER MECHANISM FOR AUTOMOBILES
Filed April 27, 1931  2 Sheets-Sheet 1
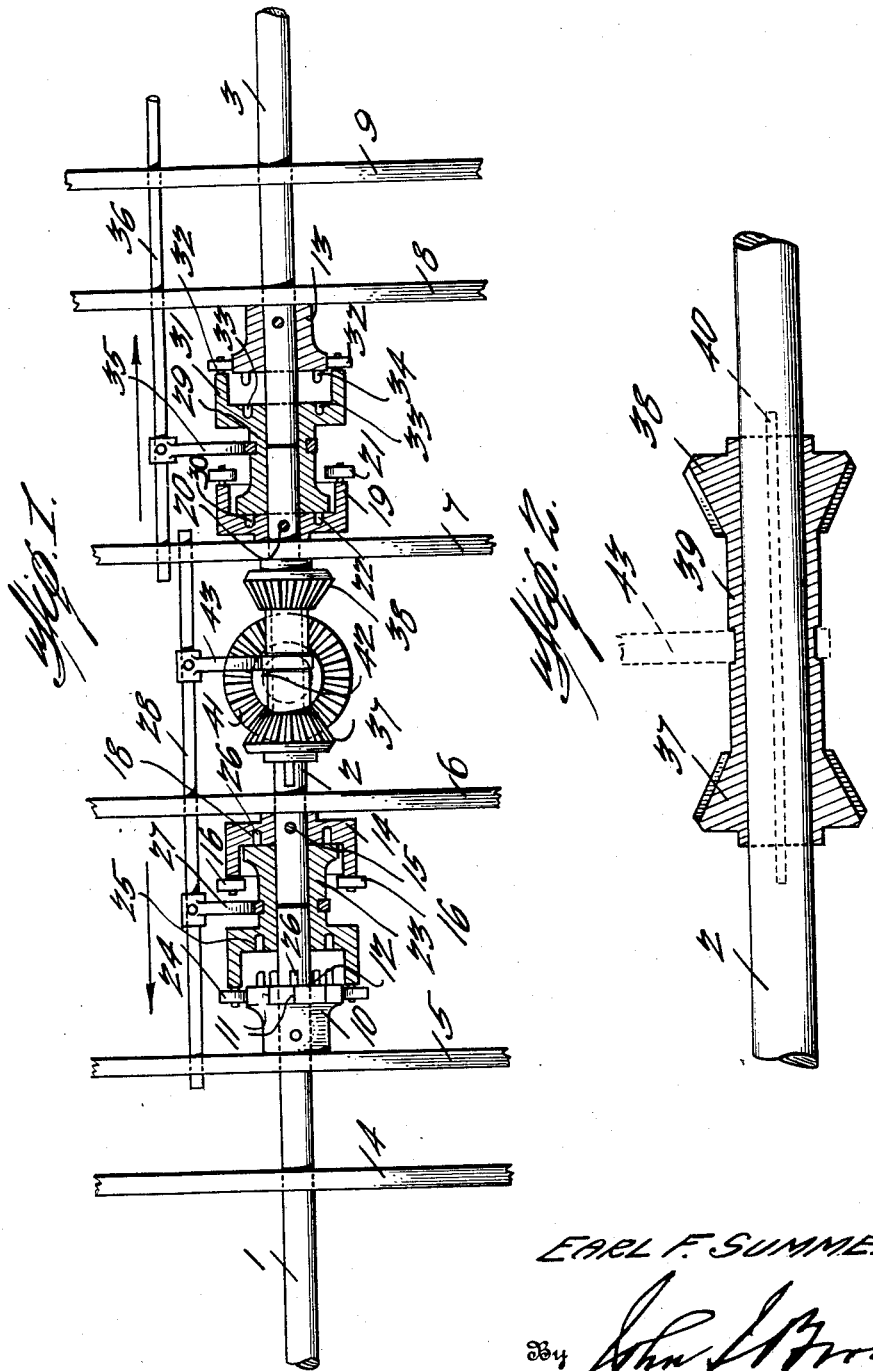
Inventor
EARL F. SUMMERS
By John L. Brown
Attorney Dec. 1, 1931.  E. F. SUMMERS  1,834,037
FREE WHEELING COASTER MECHANISM FOR AUTOMOBILES
Filed April 27, 1931   2 Sheets-Sheet 2
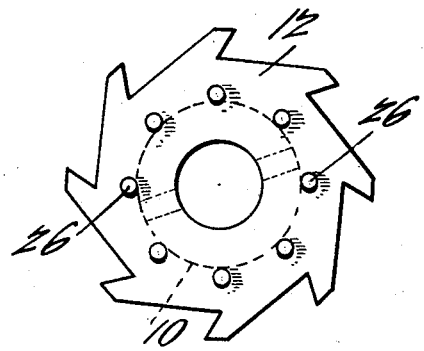
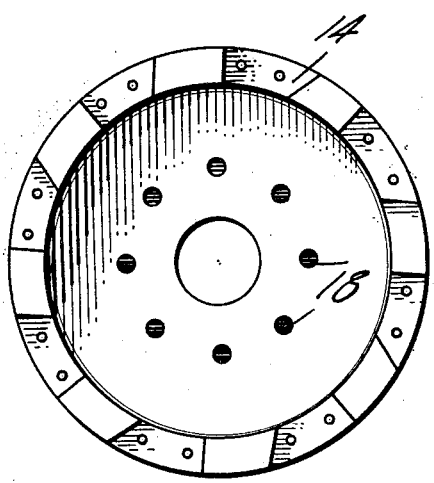
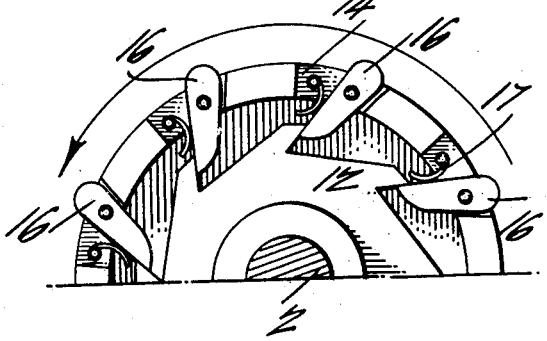
Inventor
EARL F. SUMMERS
By
Attorney Patented Dec. 1, 1931

1,834,037

UNITED STATES PATENT OFFICE

EARL F. SUMMERS, OF WHEELING, WEST VIRGINIA

FREE WHEELING COASTER MECHANISM FOR AUTOMOBILES

Application filed April 27, 1931. Serial No. 533,259.

This invention relates to improvements in automotive drive gearing, and more particularly to an arrangement of elements arranged between the rear wheels of an automobile, whereby the driving connection between the engine and the rear end may be automatically interrupted when the automobile is coasting to permit so called free wheeling, and when the engine is speeded up, the arrangement of ratchets and gears will again be coupled for positively driving the automobile either forwardly or in reverse, depending upon the position of the ring and pinion gears.

An object of the invention is to provide an improved gear and ratchet mechanism housed between the rear wheels of an automobile, whereby the ratchet mechanisms will be disengaged when the automobile is coasting, and will be positively engaged when the speed of the engine rotation is advanced in excess of the speed it would be rotating were the engine positively connected at all times with the differential mechanism.

Another object of the invention is to provide an improved free wheeling gear and ratchet mechanism positioned within the rear axle housing between the rear wheels of an automobile, and adapted to be used in conjunction with a three piece rear axle.

A further object of the invention is to provide an improved free wheeling gear and ratchet mechanism positioned within the rear axle housing between the rear wheels of an automobile, adapted to be used in conjunction with a three piece axle, and provided with manually controlled means for shifting the ratchet mechanisms and their housings to effect the free wheeling principle in either coasting forwardly or in reverse.

Other objects will appear as the description proceeds.

In the accompanying drawings which form a part of my application,

Figure 1 is a rear elevation, partly in section of my improved gear and ratchet free wheeling mechanism, showing the relation between the same and the three piece rear axle;

Figure 2 is a detail view of the middle axle section, showing the slidable interconnected forward and reverse pinions supported thereon;

Figure 3 is an end elevation of one of my improved ratchet housings;

Figure 4 is an end view of one of the pivoted pawl supporting brackets, and

Figure 5 is an end elevation of a portion of the axle section, ratchet housing and pawl supporting bracket, showing their relation when in assembled position.

Like characters of reference are used throughout the following specification and the accompanying drawings to designate corresponding parts.

In carrying out my invention, I provide a three piece axle comprising sections 1, 2 and 3, which are mounted between the housing members 4 and 5, 6 and 7, and 8 and 9, respectively, as clearly disclosed in Figure 1 of the drawings.

A combined ratchet and pin member 10 is securely fastened to the axle section 1 adjacent the housing member 5, and is provided with a plurality of ratchet teeth 11 arranged about its periphery, and is also provided with a plurality of laterally extending connecting pins 12. A similar member 13 is secured to the axle section 3 adjacent the housing member 8, and is identical with the member 10.

A pivoted pawl supporting bracket 14 is secured by a pin 15 to the end of the center axle section 2 adjacent the housing member 6 in spaced relation to the member 10. A plurality of pawls 16 are pivotally supported on the bracket 14 and are each engaged by the springs 17, which tend to force them towards the ratchet.

If desired, the pawls 16 may be suitably weighted to normally force them into engagement with the ratchets, in lieu of the cooperating ratchet teeth springs 17. The bracket 14 is also provided with a plurality of seats or recesses 18, the purpose of which will later be described. A similar pawl supporting bracket 19 is secured to the opposite end of the central axle section 2 by the pin 20, and is likewise provided with the pivoted pawls 21 and seats or recesses 22. From the drawings, it will be apparent that the pawl supporting brackets 14 and 19 are cylindrical shaped. The bracket 19 is positioned on the outside of the housing member 7 and adjacent thereto.

A ratchet cylinder 23 is slidably supported on the adjacent ends of the axle sections 1 and 2 in between the ratchet member 10 and the bracket 14, and is formed on its outer end with an integrally constructed bracket portion, exactly similar to the bracket 14, that is, it has the pivoted pawls 24 on its outer end, and is provided with the seats or recesses 25 at the same end, while a plurality of pins 26 are formed at the inner end and extend laterally therefrom, and may be received or seated within the seats in the said bracket 14, when the cylinder 23 is moved in juxtaposition thereto. A yoke 27 is secured to the cylinder 23 and is also connected with a slidable guide rod 28 mounted between the housing members 5, 6 and 7 for selectively operating the said cylinder. A similar cylinder 29 is slidably supported on the adjacent ends of the axle sections 2 and 3, and is likewise provided with the inwardly directed pins 30, and at the opposite end with the integrally formed bracket 31 on which the pawls 32 are pivoted. Seats or recesses 33 are also formed in the end of the cylinder 29 adjacent the bracket 31 and are adapted to receive the pins 34 on the member 13 when the cylinder is moved towards its outermost position. A yoke 35 is secured to the cylinder 29, and is also connected to the slidable guide 36 for selectively moving the said cylinder into its inner or outer position, as desired.

The spaced pinion gears 37 and 38 are connected together by a collar 39, and are slidable over a key 40 on the central axle section 2, for selective engagement with the ring gear 41, which in turn is engaged or driven by the propeller shaft 42 of the automobile. A yoke 43 is mounted on the collar 39 for shifting the pinion gears so that either one or the other will be engaged by the ring gear, to drive the automobile forwardly or in a reverse direction. The yoke 43 is also attached to the slidable guide rod 28, so that the mechanism on the left rear of the differential assembly may be moved at the same time the pinion gears are moved. It is pointed out that the arrangement shown in Figure 1 of the drawings, shows the gearing and ratchets set for the moving of the automobile in the reverse direction.

When it is desired to operate the automobile in a forward direction, it is only necessary to move the guide rods 28 and 36 in the directions of the arrows shown in Figure 1 of the drawings.

It is known that there are free wheeling arrangements adapted to be positioned within the transmission housing, and that there are other arrangements adapted to be placed between the transmission and the differential, but it is believed to be novel to place a free wheeling gear and ratchet arrangement between the rear wheels of an automobile, and to use the same in connection with a three section rear axle.

Many minor changes in detail of construction may be resorted to without departure from the spirit of the invention.

Having thus described my invention what I claim as new and desire to secure by Letters Patent of the United States is:

1. In a combined gear and ratchet free wheeling coaster mechanism for automobiles, the combination of a three piece rear axle, combined pin and ratchet members secured to the inner ends of the outer axle sections, pivoted pawl carrying brackets secured to the outer ends of the intermediate axle section, means for driving the intermediate axle section, and shiftable ratchet mechanisms supported upon the opposite ends of the intermediate axle section and the adjacent ends of the outer axle sections.

2. In a combined gear and ratchet free wheeling coaster mechanism for automobiles, the combination of a three piece rear axle, combined pin and ratchet members secured to the inner ends of the outer axle sections, pivoted pawl carrying brackets secured to the outer ends of the intermediate axle section, means for driving the intermediate axle section, shiftable ratchet mechanisms supported upon the opposite ends of the intermediate axle section and the adjacent ends of the outer axle sections, and pins and pivoted pawls and sockets formed on the inner and outer ends of the said last mentioned mechanisms, respectively.

3. In a combined gear and ratchet free wheeling coaster mechanism for automobiles, the combination of a three piece rear axle, combined pin and ratchet members secured on the inner ends of the outer axle sections, pivoted pawl carrying brackets secured on the outer ends of the intermediate axle section, a ring gear and selectively engageable pinions for driving said intermediate axle section, shiftable ratchet mechanisms supported on the opposite ends of the intermediate axle section and the adjacent ends of the outer axle sections, pins, and pivoted pawls and sockets formed on the inner and outer ends of the last mentioned mechanisms, respectively, and means for simultaneously shifting one of said mechanisms and pinions with respect to the ring gear, whereby the automobile may operate in a forward or backward direction.

4. The combination as claimed in claim 3, and a guide rod having spaced yokes mounted thereon and connected with one of the shiftable ratchet mechanisms and the shiftable pinions whereby the same may be simultaneously shifted when desired.

5. The combination as claimed in claim 3, a guide rod having spaced yokes mounted thereon and connected with one of the shiftable ratchet mechanisms and the shiftable pinions, and a second guide rod having a yoke mounted thereon connected with the other shiftable ratchet mechanism, whereby the shifting of said rods will place the gears and mechanisms in their proper relation for forward or backward movement of the automobile.

In testimony whereof I affix my signature.

EARL F. SUMMERS.